United States Patent
Faroudja et al.

(10) Patent No.: US 9,445,131 B1
(45) Date of Patent: Sep. 13, 2016

(54) DE-BLOCKING AND DE-BANDING FILTER WITH ADJUSTABLE FILTER STRENGTH FOR VIDEO AND IMAGE PROCESSING

(71) Applicant: Faroudja Enterprises, Inc., Los Altos, CA (US)

(72) Inventors: Yves Faroudja, Los Altos, CA (US); Daniel Campbell, Los Altos, CA (US); Xu Dong, Los Altos, CA (US)

(73) Assignee: Faroudja Enterprises, Inc., Los Altos, CA (US)

( * ) Notice: Subject to any disclaimer, the term of this patent is extended or adjusted under 35 U.S.C. 154(b) by 0 days.

(21) Appl. No.: 14/683,777

(22) Filed: Apr. 10, 2015

Related U.S. Application Data (60) Provisional application No. 62/107,148, filed on Jan. 23, 2015.

(51) Int. Cl.

| | |
|---|---|
| H04N 7/12 | (2006.01) |
| H04N 11/02 | (2006.01) |
| H04N 11/04 | (2006.01) |
| H04B 1/66 | (2006.01) |
| G06K 9/40 | (2006.01) |
| H04N 19/86 | (2014.01) |
| H04N 19/117 | (2014.01) |
| H04N 19/136 | (2014.01) |
| H04N 19/186 | (2014.01) |

(52) U.S. Cl.
CPC ............ H04N 19/86 (2014.11); H04N 19/117 (2014.11); H04N 19/136 (2014.11); H04N 19/186 (2014.11)

(58) Field of Classification Search
None
See application file for complete search history.

(56) References Cited

U.S. PATENT DOCUMENTS

| | | | | |
|---|---|---|---|---|
| 6,792,152 B1* | 9/2004 | Shibata | ............... | H04N 19/139 375/E7.135 |
| 2004/0228415 A1* | 11/2004 | Wang | .................... | H04N 19/86 375/240.29 |
| 2005/0196066 A1* | 9/2005 | Kim | ..................... | H04N 19/159 382/268 |
| 2007/0071095 A1* | 3/2007 | Lim | ...................... | H04N 19/86 375/240.29 |
| 2007/0230803 A1* | 10/2007 | Ueno | ................... | H04N 19/647 382/233 |
| 2008/0037897 A1* | 2/2008 | Chiang | .................. | G06T 5/009 382/273 |
| 2008/0170620 A1* | 7/2008 | Zhang | ................. | H04N 19/176 375/240.18 |
| 2008/0240252 A1* | 10/2008 | He | ....................... | H04N 19/176 375/240.24 |
| 2008/0317377 A1* | 12/2008 | Saigo | .................... | H04N 9/045 382/274 |
| 2009/0074084 A1* | 3/2009 | Drezner | ............... | H04N 19/139 375/240.29 |

(Continued)

*Primary Examiner* — Joseph Ustaris
*Assistant Examiner* — Rebecca Volentine
(74) *Attorney, Agent, or Firm* — Invent Capture, LLC.; Samuel S. Cho (57) ABSTRACT

A novel de-blocking and de-banding filter and a related method of operation reduce and/or remove blocking and banding artifacts that originate from a low bitrate video compression. For filtering a luminance channel, the de-blocking and de-banding filter determines filtering needs and also adjusts filtering strengths based on a compression level ($Q_p$) and a gray level of the video signal. For filtering a chrominance channel, the de-blocking and de-banding filter determines the filtering needs and adjusts the filtering strengths based on $Q_p$ alone. Preferably, the de-blocking and de-banding filter utilizes a low pass filter of adjustable strength at a border of a block perpendicular to the border or a band border. The adjustable strength of the de-blocking and de-banding filter is a function of the compression level ($Q_p$) and/or the gray level of the video signal, but does not depend on a duration of the blocking and/or banding artifacts.

12 Claims, 8 Drawing Sheets

300
A Block Diagram of a Smart Filter Strength Control Unit for a De-Blocking and De-Banding Filter (For Luminance Channel)

(56) References Cited

U.S. PATENT DOCUMENTS

| | | | |
|---|---|---|---|
| 2010/0177983 A1* | 7/2010 | Hsu | H04N 19/172 382/268 |
| 2011/0222607 A1* | 9/2011 | An | H04N 19/159 375/240.24 |
| 2012/0207228 A1* | 8/2012 | Winger | H04N 19/80 375/240.29 |
| 2013/0259141 A1* | 10/2013 | Van der Auwera | H04N 19/00909 375/240.29 |
| 2013/0266061 A1* | 10/2013 | An | H04N 19/00066 375/240.02 |
| 2014/0321552 A1* | 10/2014 | He | H04N 19/00909 375/240.16 |
| 2014/0376608 A1* | 12/2014 | Tourapis | H04N 19/117 375/240.02 |

* cited by examiner

A De-Blocking and De-Banding Unit with Adjustable Filter Strength as a Loop Filter in a Compression Encoder for Video and/or Images

A De-Blocking and De-Banding Unit with Adjustable Filter Strength as a Post-Processing Filter in a Compression Decoder for Video and/or Images

A Block Diagram of a Smart Filter Strength Control Unit for a De-Blocking and De-Banding Filter (For Luminance Channel)

An Example of a Threshold Level Function, (g($Q_p$)), as a Function of $Q_p$

FIG. 4

An Example of a Gray Level Function, (h($Q_p$)), as a Function of $Q_p$

FIG. 5

An Example of a Threshold Level Function, (g(Bitrate)), as a Function of Bitrate

FIG. 6

An Example of a Gray Level Function, (h(Bitrate)), as a Function of Bitrate

An Example of a Frequency Response Curve of a Bi-Dimensional Low Pass Filter that Filters More Severely in the Horizontal and the Vertical Directions

FIG. 8

DE-BLOCKING AND DE-BANDING FILTER WITH ADJUSTABLE FILTER STRENGTH FOR VIDEO AND IMAGE PROCESSING

BACKGROUND OF THE INVENTION

The present invention generally relates to image and video processing. More specifically, the present invention relates to a filter unit that can reduce or eliminate block and banding artifacts resulting from compression of image and/or video signals. The present invention also relates to a method of de-blocking and de-banding the image and/or video signals with the filter unit. Furthermore, the present invention also relates to dynamically adjusting filter strength of the filter unit based on gray level information and quantization parameters of the image and/or video signals.

For modern video compression standards, block-based coding has become a popular solution for video compression. For example, commonly-utilized video compression standards such as MPEG-1, MPEG-2, MPEG-4, and HEVC/H.265 utilize block-based coding. However, the coarse quantization of the frequency transform components, which are typically assembled in non-overlapping blocks with independent processing, is prone to generating visible grid patterns in decoded frames. These grid patterns are typically aligned on transform block boundaries for intra frames, and conventional motion compensation process spread the grid patterns into P and B frames. Therefore, "blocking artifacts" (i.e. interchangeably called herein as "blocking effects") can be located anywhere inside related images generated by the block-based coding video compression methods. A blocking artifact is an undesirable visual effect caused by heavy quantization errors that coarsely produce identical or similar values for image and/or video information during a compression encoding process.

Furthermore, another undesirable visual effect called "banding artifacts" (i.e. interchangeably called herein as "banding effects") appear when a quasi-horizontal or quasi-vertical transition occurs near block borders. Banding artifacts may spread over a large amount of block boundaries, thus making the duration of the artifacts unpredictable. A banding artifact may be construed as a collection of blocking artifacts on several adjacent macro blocks to form a larger-size blocking artifact.

Numerous de-blocking algorithms have attempted to alleviate blocking and banding artifacts for video processing. For example, a two dimensional signal-adaptive filtering has been utilized, and has worked satisfactorily for still-coded images that exhibit blocking artifacts at block boundaries. However, because blocking artifacts in video coding can occur at any position in a frame, a conventional two dimensional signal-adaptive filtering is generally insufficient to remove blocking artifacts in video data. Another conventional attempt to reduce blocking and banding artifacts in video utilizes a one-dimensional vertical filter to remove horizontal edges first, followed by a one-dimensional horizontal filter to remove vertical edges. Although the conventional sequential application of the one-dimensional vertical filter and the one-dimensional horizontal filter is sometimes effective in reducing undesirable artifacts, its effectiveness is inherently limited by its inability to adjust filter strengths dynamically relative to video characteristics and compression parameters.

For example, a conventional de-blocking and/or de-banding filter typically detects maximum and minimum pixel values in a processing area. If the difference between the maximum and the minimum is smaller than a static (i.e. pre-set) threshold value, pixels in the processing area is low-pass filtered to remove blocking and/or banding artifacts. Unfortunately, the static nature of the threshold value in the conventional de-blocking and/or de-banding filter is not dynamically adaptable to compression levels or to particular video characteristics undergoing processing. Therefore, if the static threshold value is set too low, then at least some of the undesirable artifacts cannot be filtered out. On the other hand, if the static threshold is set too high, then the conventional filter inadvertently filters out useful detail information in a video image frame.

Moreover, as viewers' usage of bandwidth continue to increase in multimedia applications, a high bit-rate compression is not always feasible or accessible for transmission of video contents. Utilizing lower bit-rate compression in such situations increases occurrences of blocking and banding artifacts in the reproduction of video contents.

Therefore, it may be desirable to provide a novel de-blocking and de-banding filter that can dynamically adjust its filter strength based on compression levels and particular characteristics of video data that are most relevant to human visual perception. Furthermore, it may also be desirable to provide a method of operating the novel de-blocking and de-banding filter for dynamically-adjusted filtering of undesirable visual artifacts in image and/or video data based on compression levels and particular characteristics of video data that are most relevant to human visual perception.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a de-blocking and de-banding filter for a video signal processing is disclosed. This de-blocking and de-banding filter comprises: a smart filter strength control unit that receives a current gray level (Y) and at least one of a compression level (Qp) and a bitrate of a video signal to generate an adjustable filter strength level (T); and a de-blocking and de-banding unit containing a signal filter, wherein the de-blocking and de-banding unit receives the adjustable filter strength level (T) from the smart filter strength control unit, and wherein the de-blocking and de-banding unit is configured to reduce or remove a blocking artifact or a banding artifact with the signal filter at a variable filter strength controlled by the adjustable filter strength level (T).

In another embodiment of the invention, a method of reducing or removing blocking and banding artifacts in a video signal with a de-blocking and de-banding filter for a luminance channel is disclosed. This method comprises the steps of: receiving a current gray level (Y) and at least one of a compression level (Qp) and a bitrate of the video signal in a smart filter strength control unit; calculating a mean gray level value from a mean calculation unit in the smart filter strength control unit; generating a gray level function value from a gray level function (h(x)) generation unit in the smart filter strength control unit, wherein the gray level function value is a function of the compression level (Qp) or the bitrate of the video signal; subtracting the gray level function value from the mean gray level value in a signal subtractor unit; if the signal subtractor unit generates a positive value, then assigning zero to an adjustable filter strength level (T); else if the signal subtractor unit generates zero or a negative value, then assigning a threshold level output value from a threshold level function (g(x)) generation unit to the adjustable filter strength level (T), wherein the threshold level output value depends on the compression level (Qp) or the bitrate of the video signal; and transmitting the adjustable filter strength level (T) to a signal filter in the de-blocking and de-banding filter for the luminance channel, wherein the signal filter selectively reduces or removes a blocking artifact or a banding artifact at a variable filter strength controlled by the adjustable filter strength level (T).

Yet in another embodiment of the invention, a method of reducing or removing blocking and banding artifacts in a video signal with a de-blocking and de-banding filter for a chrominance channel is disclosed. This method comprises the steps of: receiving at least one of a compression level (Qp) and a bitrate of the video signal in a smart filter strength control unit; generating a threshold level output value from a threshold level function (g(x)) generation unit in the smart filter strength control unit, wherein the threshold level output value depends on the compression level (Qp) or the bitrate of the video signal; assigning the threshold level output value to an adjustable filter strength level (T); and transmitting the adjustable filter strength level (T) to a signal filter in the de-blocking and de-banding filter for the chrominance channel, wherein the signal filter selectively reduces or removes a blocking artifact or a banding artifact at a variable filter strength controlled by the adjustable filter strength level (T).

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble systems and methods for de-blocking and de-banding filter with adjustable filter strength for video and image processing. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention do not inherently indicate any particular order nor imply any limitations in the invention.

For the purpose of describing the invention, a term "blocking artifact," which is interchangeably called the "blocking effect," is defined as an unintended and undesirable visual error created during an image and/or video compression. Typically, this unintended and undesirable visual error is caused by heavy quantization error during a compression encoding process that erroneously fills pixels in a macro block with identical or similar values.

Furthermore, for the purpose of describing the invention, a term "banding artifact," which is interchangeably called the "banding effect," is defined as an unintended and undesirable visual error created during an image and/or video compression, wherein the unintended and undesirable visual error appears when a quasi-horizontal or quasi-vertical transition occurs near block borders. Banding artifacts may spread over a large amount of block boundaries, thus making the duration of the artifacts unpredictable. Furthermore, at least in some instances, a banding artifact may be construed as a collection of blocking artifacts on several adjacent macro blocks to form a larger-size blocking artifact.

Furthermore, for the purpose of describing the invention, a term "de-blocking and de-banding filter" is defined as a functional unit that provides reduction, filtering, and/or removal of undesirable blocking and banding artifacts, which may appear in decoded image data or video data. In one example, the functional unit serving as a de-blocking and de-banding filter may be implemented by an electronic program executed on a programmable device and/or another hardware device, such as a graphics processor unit (GPU), a field programmable gate array (FPGA), a central processing unit (CPU), and a memory unit of a computing device or another electronic device. Examples of the computing device include, but are not limited to, a notebook computer, a desktop computer, a portable electronic device, a mobile device, a tablet computer, and a television. In another example, the functional unit serving as a de-blocking and de-banding filter may be at least partially hardwired and/or embedded codes operating in an application-specific integrated circuit (ASIC), or another semiconductor chip that loads the hardwired and/or embedded codes. ASIC's or other semiconductor chips that hardwire and/or embed the functionality of the de-blocking and de-banding filter may be utilized in televisions and other electronic devices. In a preferred embodiment of the invention, the de-blocking and de-banding filter may be independent of a particular compression standard.

One aspect of an embodiment of the present invention is providing a novel de-blocking and de-banding filter that can dynamically adjust its filter strength based on compression levels and particular characteristics of video data that are most relevant to human visual perception.

Another aspect of an embodiment of the present invention is providing a method of operating a novel de-blocking and de-banding filter for dynamically-adjusted filtering of undesirable visual artifacts in image and/or video data based on compression levels and particular characteristics of video data that are most relevant to human visual perception.

Yet another aspect of an embodiment of the present invention is utilizing a novel de-blocking and de-banding filter to reduce or eliminate blocking and banding artifacts in luminance processing of video data.

Yet another aspect of an embodiment of the present invention is utilizing a novel de-blocking and de-banding filter to reduce or eliminate blocking and banding artifacts in chrominance processing of video data.

Figure 1:
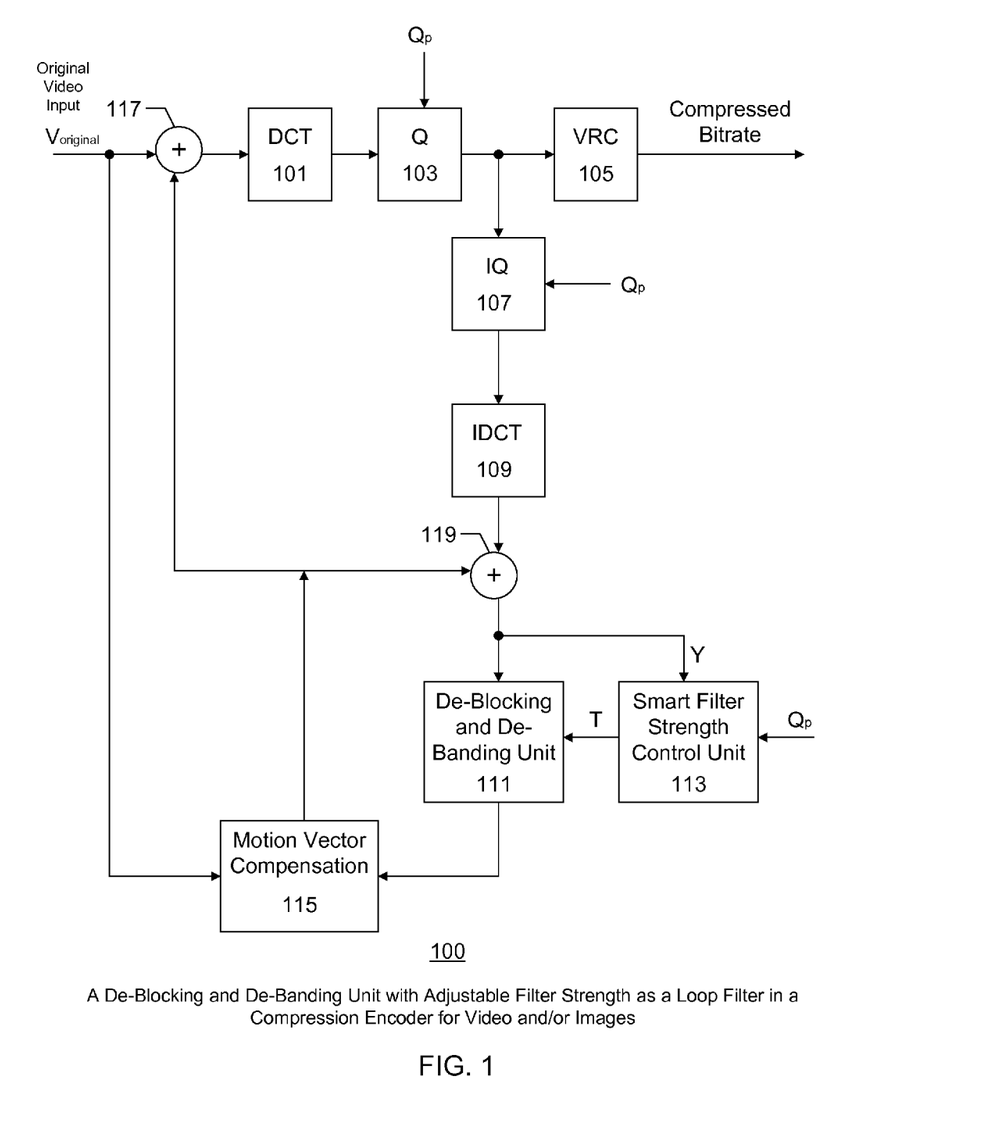
FIG. 1 shows a de-blocking and de-banding unit with adjustable filter strength as a loop filter in a compression encoder for video and/or images, in accordance with an embodiment of the invention.
Figure 4:
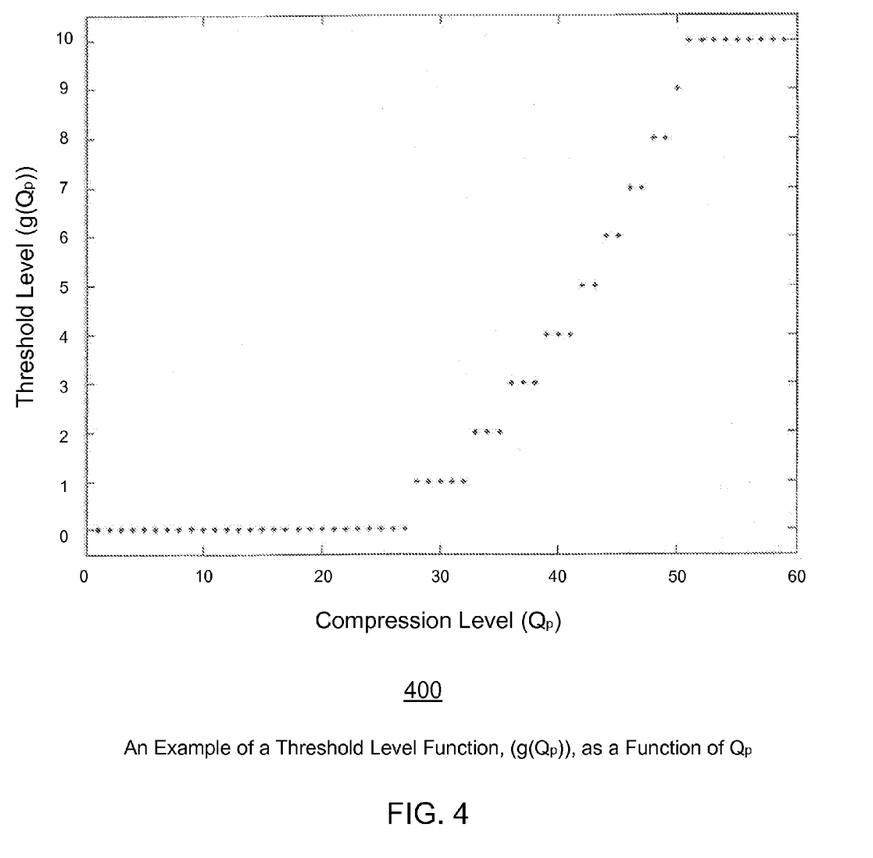
FIG. 4 shows an example of a threshold level function, $g(Q_p)$, as a function of $Q_p$, in accordance with an embodiment of the invention.
Figure 6:
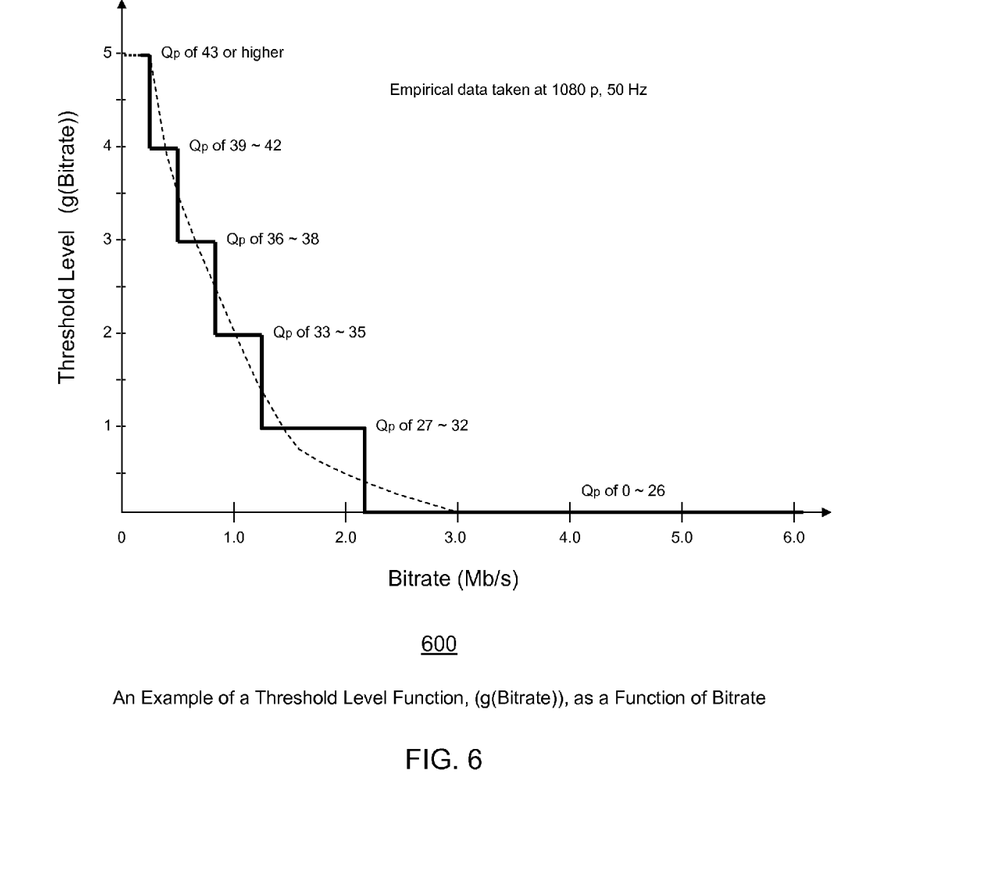
FIG. 6 shows an example of a threshold level function g(Bitrate), as a function of bitrate, in accordance with an embodiment of the invention.

FIG. 1 shows a de-blocking and de-banding unit (111) with adjustable filter strength as a loop filter in a compression encoder (100) for video and/or images, in accordance with an embodiment of the invention. In a preferred embodiment of the invention, the compression encoder (100) incorporates the de-blocking and de-banding unit (111) to reduce or eliminate blocking and banding artifacts, and also incorporates a smart filter strength control unit (113) to provide a dynamic determination of a filtering threshold level, or "g(x)," as a function of a compression level ($Q_p$), or a correlating data bitrate to the compression level ($Q_p$). In the preferred embodiment of the invention, the filtering threshold level may be a function of the compression level and be expressed as "g($Q_p$)," as shown in FIG. 4. In another embodiment of the invention, the filtering threshold level may be a function of the correlating data bitrates to the compression level ($Q_p$), and be expressed as "g(Bitrate)," as shown in FIG. 6.

Furthermore, depending on the needs of a particular application, the de-blocking and de-banding unit (111) and the smart filter strength control unit (113) can be utilized for filtering a luminance channel or a chrominance channel in the compression encoder (100) to reduce or eliminate blocking and banding artifacts in the encoded video and/or image signals. For filtering either the luminance channel or the chrominance channel, the de-blocking and de-banding unit (111) and the smart filter strength control unit (113) can utilize compression level ($Q_p$) information or correlated bitrate information to determine the filtering threshold level (g(x)).

In case of filtering the luminance channel, gray level function (h(x)), which is also expressed as a function of the compression level ($Q_p$) information or correlated bitrate information, may be additionally utilized for blocking and banding artifact filtering determination in an image processing area with certain amount of gray level. On the other hand, for filtering the chrominance channel, gray level function information may not need to be considered because the chrominance channel typically only carries color information of an image, while the luminance channel carries achromatic portion of the image.

A novel aspect of an embodiment of the present invention is attributed to leveraging modern understanding of human visual perception, especially in case of filtering blocking and banding artifacts in the luminance channel. In particular, Weber's law states "C=dS/S," where C is a constant, dS is a noticeable differential increase in a stimulus, and S is an instantaneous stimulus. This means that "just noticeable difference," or "JND," of the human visual perception is proportional to the video signal gray level. When the video signal gray level is low, humans can see very small differences. On the other hand, when the video signal gray level is high, the JND level is correspondingly high.

Therefore, in the preferred embodiment of the invention, a design principle for luminance channel filtering by the de-blocking and de-banding unit (111) and the smart filter strength control unit (113) involves configuring the filtering strength of a low-pass filter (i.e. in a direction perpendicular to a block edge) in the de-blocking and de-banding unit (111) to be correlated not only to the compression level ($Q_p$), but also to the gray level function (h(x)), as a clever application of Weber's law. As human visual perception is more sensitive to artifacts in a darker area of an image rather than a lighter area, an embodiment of the present invention increases the filtering strength in dark gray luminance zones for the luminance channel.

Continuing with FIG. 1, the compression encoder (100) also comprises a discrete cosine transform (DCT) block (101), a quantization (Q) unit (103), a variable rate coding (VRC) unit (105), an inverse quantization (IQ) unit (107), an inverse discrete cosine transform (IDCT) unit (109), a motion vector compensation unit (115), and signal adders (117, 119). As shown in FIG. 1, in the preferred embodiment of the invention, an original video input signal ($V_{original}$) is transmitted to a first signal adder (117) and the motion vector compensation unit (115), which outputs a motion vector-compensated signal and adds to the first signal adder (117). The DCT block (101) then receives the added signals from the first signal adder (117) and performs discrete cosine transformation on the added signals. Then, the quantization (Q) unit (103) compresses the discrete cosine transformed signals based on a particular compression level ($Q_p$), and its output is sent to a loop filter system that includes the inverse quantization (IQ) unit (107), the inverse discrete cosine transform (IDCT) unit (109), a second signal adder (119), the de-blocking and de-banding unit (111), the smart filter strength control unit (113), and the motion vector compensation unit. The output from the quantization (Q) unit (103) is also sent to the variable rate coding (VRC) unit (105), which encodes the filtered video signals from the loop filter system and generates a compressed bitrate signal, as shown in FIG. 1.

Furthermore, as shown in FIG. 1, the smart filter strength control unit (113) receives gray level (Y) information and compression level ($Q_p$) information of the video signal, and generates an adjustable filter strength level (T) for blocking and banding artifacts filtering. As explained previously, in the preferred embodiment of the invention, the adjustable filter strength level (T) is dynamically set in real time. In case of a luminance channel filtering, the adjustable filter strength level (T) generated by the smart filter strength control unit (113) is dependent on both the compression level ($Q_p$) information and the gray level (Y) information for a particular image processing area. In case of a chrominance channel filtering, the adjustable filter strength level (T) is only dependent on the compression level ($Q_p$) information.

In the preferred embodiment of the invention, the de-blocking and de-banding unit (111) contains a low-pass filter with a dynamically-adjusted filter strength to reduce or eliminate blocking and/or banding artifacts intelligently and selectively, based on the compression level ($Q_p$) information and/or the gray level (Y) information. In one example, the adjustable filter strength level (T) is defined as "T=$g(Q_p)$, if Mean (Y)≤$h(Q_p)$." In this definition, $Q_p$ is a compression ratio of a macro block under processing. When the value of $Q_p$ is 0, the compression is a lossless process. When the value of $Q_p$ is a nonzero number, the magnitude of $Q_p$ is directly proportional to the compression level. Therefore, when the value of $Q_p$ is big (e.g. exceeding 50, as in the case of H.264 standard), then the compression ratio is very high. $Q_p$ can change from one frame to another frame, or from one macro block to another macro block.

Furthermore, g(x) is a variable as a function of Qp (x=Qp) or bitrate (x=bitrate) that correlates to the compression level (Qp). When Qp is smaller than an a "noticeable quality degradation starting point" compression level, then g(Qp), which represents the adjustable filter strength level (T) output from the smart filter strength control unit (113), is zero. A zero adjustable filter strength level (T) suggests that the de-blocking and de-banding unit (111) does not need to apply any filtering to the video and/or image signals, because the compression level ($Q_p$) is sufficiently low to not suffer from blocking and/or banding artifacts. In the preferred embodiment of the invention, the "noticeable quality degradation starting point" compression level may be defined by a particular video or image compression standard, or by an empirical output of $g(Q_p)$, as illustrated by FIG. 4. For example, H.264 standard may define the "noticeable quality degradation starting point" compression level to be $Q_p$=20. For another encoding standard, a different magnitude of $Q_p$ may be defined and utilized for the "noticeable quality degradation starting point" compression level.

On the other hand, when $Q_p$ exceeds the "noticeable quality degradation starting point" compression level, then $g(Q_p)$ provides an increasing and appropriate adjustable filter strength level (T), as exemplified by the functional graph of $g(Q_p)$ in FIG. 4. In case of the de-blocking and de-banding unit (111) incorporated in the compression encoder (100) in FIG. 1, a threshold level function, $g(Q_p)$, is generated by the smart filter strength control unit (113) and transmitted to the de-blocking and de-banding unit (111) for adjusting filtering strength of reducing and/or eliminating blocking and/or banding artifacts.

Figure 3:
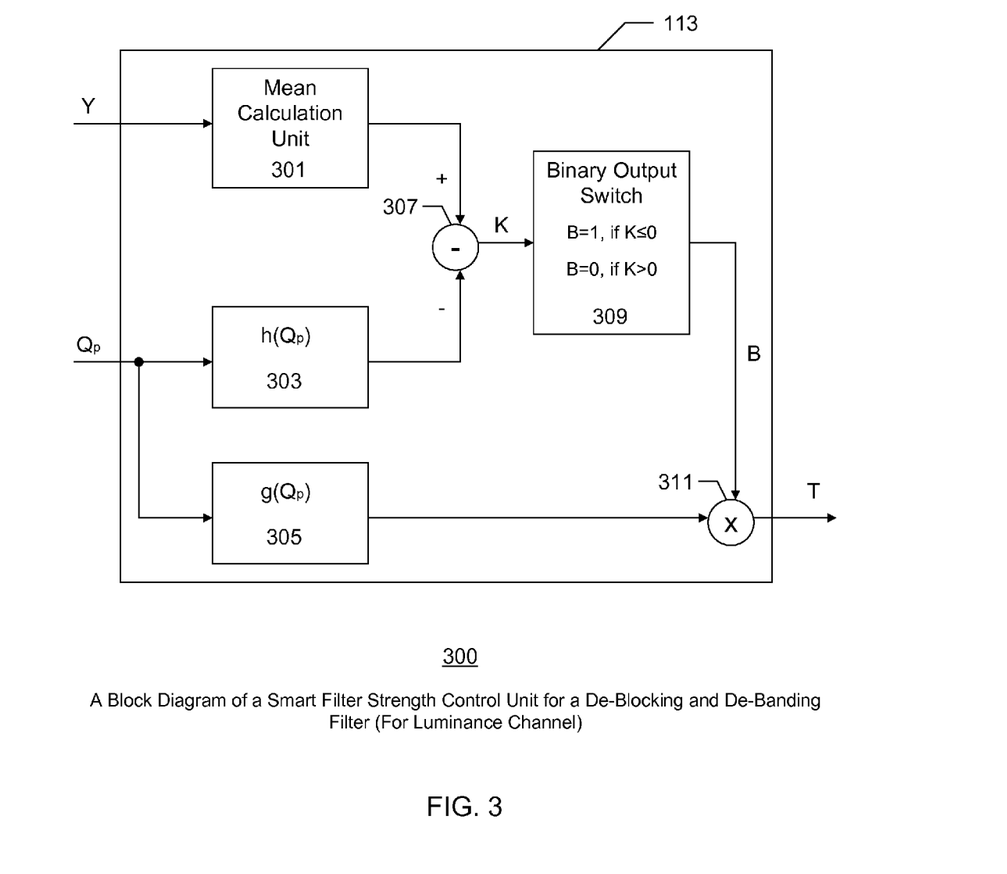
FIG. 3 shows a block diagram of a smart filter strength control unit for a de-blocking and de-banding filter for luminance channel use, in accordance with an embodiment of the invention.

Moreover, "Mean (Y)" signifies a mean function for the video signal gray level in a processing area. Calculation of "Mean (Y)" is particularly useful for the blocking and banding filtering in the luminance channel, because understanding the average gray level of the processing area assists the smart filter strength control unit (113) to enable or disable filtering (i.e. to assign "0" to the adjustable filter strength level (T) or not). As shown in FIG. 3, if "Mean (Y)" from a mean calculation unit (301) is greater than a particular gray level function, $h(Q_p)$, in the processing area, then the adjustable filter strength level (T) is zero (i.e. because B=0), which means that filtering is disabled in the de-blocking and de-banding unit (111). On the other hand, if "Mean (Y)" from a mean calculation unit (301) is equal to or less than the particular gray level function, $h(Q_p)$, then a binary output switch (309) is turned on (i.e. B=1), and the functional value of $g(Q_p)$ is assigned as the adjustable filter strength level (T).

Furthermore, h(x), which represents a gray level function of the video and/or image signal, is a variable in function of a compression level ($Q_p$) or a bitrate that correlates to the compression level. For example, $h(Q_p)$ can provide an increasing gray level from 0 to 255, in case of an eight-bit quantization video system, while $Q_p$ is increasing from 0 to over 50. The gray level function, h(x), may be utilized for de-blocking and de-banding filtering decisions in the luminance channel because the gray level information is carried by the luminance channel. In contrast, for filtering the chrominance channel, gray level function information may not need to be considered because the chrominance channel typically only carries color information of an image.

In one embodiment of the invention, a method of operating the de-blocking and de-banding filter (e.g. 111 of FIG. 1, or 203 of FIG. 2) for processing the luminance channel can be described in several steps. First, if a current compression level ($Q_p$) in a processed area is lower than a "noticeable quality degradation starting point" compression level, the smart filter strength control unit (e.g. 113 of FIG. 1, or 113 of FIG. 3) determines that the current compression level ($Q_p$) is low enough to not suffer from blocking and/or banding artifacts. In this case, the adjustable filter strength level (T) is assigned a zero value, which means that no filter is applied to the processed area. In one example with H.264 video compression standard, the "noticeable quality degradation starting point" compression level may be construed as $Q_p$ of less than 20.

In another case, if the current compression level ($Q_p$) in the processed area is equal to or higher than the "noticeable quality degradation starting point" compression level, but is still low enough to have an acceptable video quality by most human visual perception, then the smart filter strength control unit (e.g. 113 of FIG. 1, or 113 of FIG. 3) selectively assigns a nonzero value to the adjustable filter strength level (T) when the processed area has a low gray level content, which is more susceptible to blocking and/or banding artifacts. The gray level function may be determined by utilizing the "h(x)" function, as exemplified by FIG. 5 and FIG. 7. In this case, the smart filter strength control unit (e.g. 113 of FIG. 1, or 113 of FIG. 3) generates a relatively low filtering strength with the nonzero adjustable filter strength level (T), which, for example, utilizes the "g(x)" function, as exemplified by FIG. 4 and FIG. 6. In this situation (i.e. the current compression level ($Q_p$) in the processed area is higher than the "noticeable quality degradation starting point" compression level, but is still low enough to have an acceptable video quality by most human visual perception), the de-blocking and de-banding filter (e.g. 111 of FIG. 1, or 203 of FIG. 2) attempts to keep detailed resolution of the processed area, while reducing and/or removing the undesirable blocking and/or banding artifacts.

In another case, if the current compression level ($Q_p$) in the processed area is determined to be very high (e.g. $Q_p$ greater than 40 for H.264 video compression standard) relative to the "noticeable quality degradation starting point" compression level, then the "g(x)" function generates a higher filtering strength for the adjustable filter strength level (T) from the smart filter strength control unit (e.g. 113 of FIG. 1, or 113 of FIG. 3), so that the de-blocking and de-banding filter (e.g. 111 of FIG. 1, or 203 of FIG. 2) applies more filtering to reduce and/or remove heavier blocking and/or banding artifacts. In this case, much of the detail signals have already been reduced by the high compression processing. Therefore, for most viewers, more frequent occurrences of heavy artifacts become the most noticeable problems rather than the lower resolution associated with the high compression processing.

Figure 2:
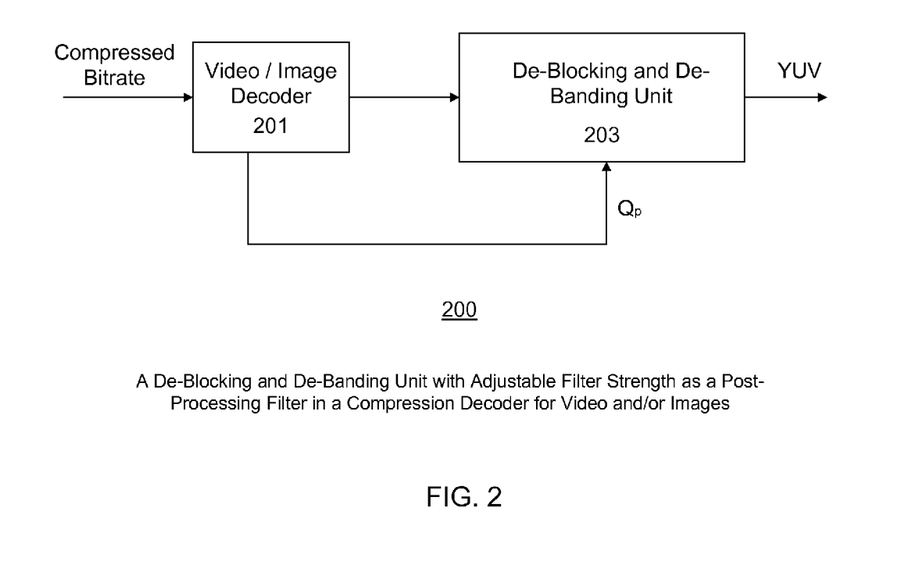
FIG. 2 shows a de-blocking and de-banding unit with adjustable filter strength as a post-processing filter in a compression decoder for video and/or images, in accordance with an embodiment of the invention.

FIG. 2 shows a de-blocking and de-banding unit (203) with adjustable filter strength as a post-processing filter in a compression decoder (200) for video and/or images, in accordance with an embodiment of the invention. In this embodiment of the invention, the de-blocking and de-banding unit (203) is incorporated on the compression decoder (200), instead of a compression encoder (e.g. 100 of FIG. 1). As shown in FIG. 2, a compressed video and/or image signal is received by a video and/or image decoder (201) of the compression decoder (200), which then decompresses and decodes the compressed video and/or image signal.

Figure 7:
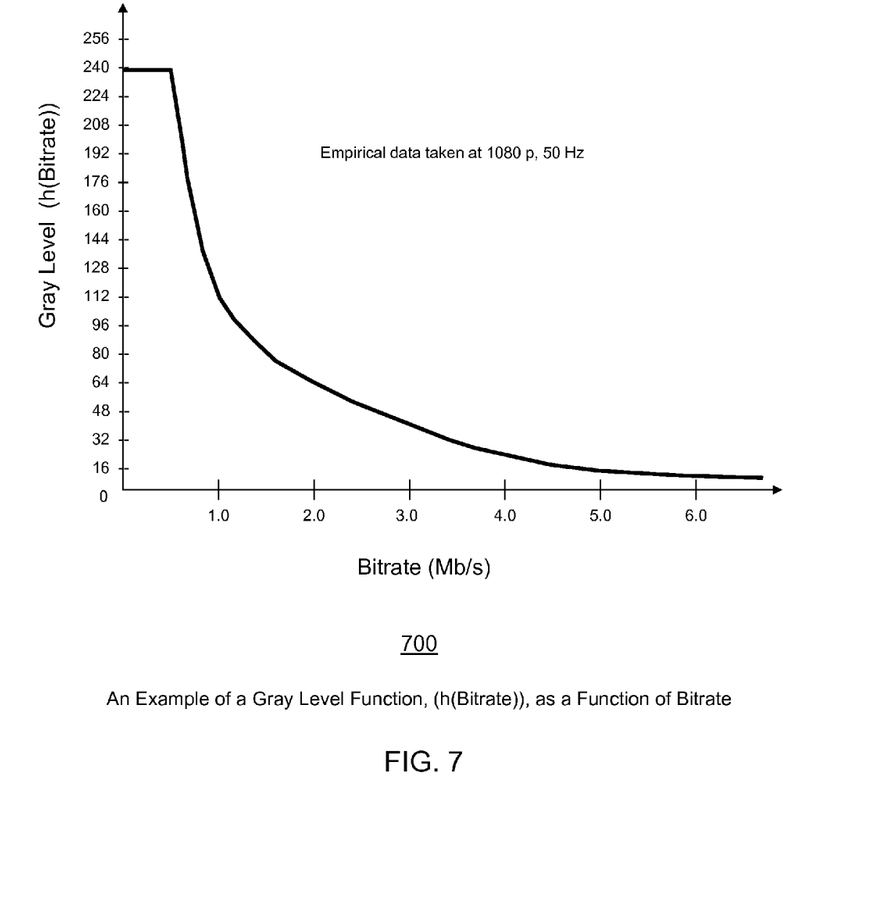
FIG. 7 shows an example of a gray level function h(Bitrate), as a function of bitrate, in accordance with an embodiment of the invention.

In many instances, the compression decoder (200) may not directly receive the compression level ($Q_p$) of the incoming compressed video and/or image signal. Furthermore, in some offline decoding or other post-processing filter applications, the compression level ($Q_p$) may not be readily available. However, the compression level ($Q_p$) can be derived from or correlated to the known bitrate of the compressed video and/or image signal. For example, the compression level ($Q_p$) may be estimated by the known bitrate of the compressed video and/or image signal and a particular compression standard. Then, a threshold level function (g(x)) and a gray level function (h(x)), which are utilized in the de-blocking and de-banding unit (203), may be calculated as functions of the compression level ($Q_p$) (i.e. $g(Q_p)$, $h(Q_p)$). Alternatively, the threshold level function (g(x)) and the gray level function (h(x)) may be calculated directly as functions of the known bitrate (i.e. g(bitrate), h(bitrate)) of the compressed video and/or image signal, as shown in FIG. 6 and FIG. 7, respectively.

Continuing with FIG. 2, the de-blocking and de-banding unit (203) with adjustable filter strength as the post-processing filter in the compression decoder (200) is configured to reduce or remove blocking and/or banding artifacts contained in a decoded stream of the compressed video and/or image signal. As shown in FIG. 2, the de-blocking and de-banding unit (203) outputs a decompressed, decoded, and filtered YUV signal. In one embodiment of the invention, the de-blocking and de-banding unit (203) contains a smart filter strength control unit and a low-pass filter for de-blocking and de-banding. In another embodiment of the invention, the de-blocking and de-banding unit (203) is operatively connected to a smart filter strength control unit, which controls the low-pass filter inside the de-blocking and de-banding unit (203).

FIG. 3 shows a block diagram (300) of a smart filter strength control unit (113) for a de-blocking and de-banding filter for luminance channel use, in accordance with an embodiment of the invention. The smart filter strength control unit (113) may be operatively connected to or incorporated into a de-blocking and de-banding unit, depending on a particular implementation in accordance with an embodiment of the invention. In the embodiment of the invention shown in FIG. 3, the smart filter strength control unit (113) comprises a mean calculation unit (301), a gray level function ($h(Q_p)$) generation unit (303), a threshold level function ($g(Q_p)$) generation unit (305), a signal subtractor unit (307), a binary output switch (309), and a signal multiplier unit (311).

The mean calculation unit (301) receives a current gray level (Y) of a video signal, and calculates a mean gray level value for a processing area, which is being inspected for potential filtering of undesirable artifacts. Furthermore, in one embodiment of the invention, a maximum value (MAX), a minimum value (MIN), and a filtered value (LPF) may also be calculated for the processing area for either a luminance channel filtering or a chrominance channel filtering.

As shown in FIG. 3, the gray level function ($h(Q_p)$) generation unit (303) generates a gray level function value as a function of a current compression level ($Q_p$). In one example, the gray level function value may be correlated to an $h(Q_p)$ function, as shown by a graphical example in FIG. 5. Similarly, the threshold level function ($g(Q_p)$) generation unit (305) generates a threshold level function value as a function of the current compression level ($Q_p$). In one example, the threshold level function value may be correlated to an $g((Q_p))$ function, as shown by a graphical example in FIG. 4.

In an alternate embodiment of the invention, the smart filter strength control unit (113) may utilize a gray level function generation unit and a threshold level function generation unit that operate as functions of bitrates of a video and/or image signal. Typically, bitrates correlate to compression levels reasonably well for a given video and/or image compression standard, and approximate compression levels can be extrapolated by known compression levels. A gray level function as a function of bitrate is exemplified by FIG. 7, which shows a "h(Bitrate)" functional graph. Similarly, a threshold level function as a function of bitrate is exemplified by FIG. 6, which shows a "g(Bitrate)" functional graph.

Continuing with FIG. 3, the mean gray level value from the mean calculation unit (301) is subtracted by the gray level function value from the gray level function ($h(Q_p)$) generation unit (303) in a signal subtractor unit (307). The result of the subtraction is noted as "K" in one embodiment of the invention, as shown in FIG. 3. If the value of "K" is greater than zero (i.e. if the mean gray level value is greater than the gray level function value from the gray level function ($h(Q_p)$) generation unit (303)), then an output value (B) of the binary output switch (309) is set to zero. As shown in the block diagram (300) of the smart filter strength control unit (113) in FIG. 3, the zero output setting (i.e. B=0) from the binary output switch (309) ensures that an adjustable filter strength level (T) from the smart filter strength control unit (113) is set to zero by utilizing the signal multiplier unit (311), regardless of the threshold level function value generated from the threshold level function ($g(Q_p)$) generation unit (305). In plain descriptive terms, when the mean gray level value is greater than the gray level function value from the gray level function ($h(Q_p)$) generation unit (303), the smart filter strength control unit (113) disables filtering by a low-pass filter in a de-blocking and de-banding unit (e.g. 111 of FIG. 1).

On the other hand, if the value of "K" is equal to or less than zero (i.e. if the mean gray level value is equal to or less than the gray level function value from the gray level function ($h(Q_p)$) generation unit (303)), then the output value (B) of the binary output switch (309) is set to "1". As shown in the block diagram (300) of the smart filter strength control unit (113) in FIG. 3, the output setting of one (i.e. B=1) from the binary output switch (309) ensures that a final filter strength level (T) from the smart filter strength control unit (113) is set to the threshold level function value generated from the threshold level function ($g(Q_p)$) generation unit (305), because the binary output switch (309) is allowing a pass-through of the "$g(Q_p)$" function through the signal multiplier unit (311). In plain descriptive terms, when the mean gray level value is equal to or less than the gray level function value from the gray level function ($h(Q_p)$) generation unit (303), the smart filter strength control unit (113) enables filtering by a low-pass filter in a de-blocking and de-banding unit (e.g. 111 of FIG. 1), and sets the filtering strength in accordance with the "$g(Q_p)$" function.

FIG. 4 shows a graphical example (400) of a threshold level function for filtering strength, $g(Q_p)$, as a function of $Q_p$, in accordance with an embodiment of the invention. In this particular example, the threshold level function ($g(Q_p)$)

for filtering strength is at zero when the compression level ($Q_p$) is less than approximately 28. As the compression level ($Q_p$) gets higher than 28, the threshold level function (g($Q_p$)) gradually rises, and tops out at the threshold level of 10 when the compression level ($Q_p$) exceeds low 50's, as shown by the graphical example (400) in FIG. 4. This example is a representative of a desirable threshold level function (g($Q_p$)) for a de-blocking and de-banding unit, because at low compression levels (e.g. $Q_p$ less than 28), the de-blocking and de-banding unit does not activate its low-pass filter, while in the mid-range of compression levels (e.g. $Q_p$ between 28 and low 50's), the de-blocking and de-banding unit gradually increases its filtering strength. For very high compression levels (e.g. $Q_p$ greater than low 50's), the filtering strength of the de-blocking and de-banding unit is kept at maximum (e.g. threshold level output of 10 for $Q_p$ greater than low 50's) to remove blocking and banding artifacts aggressively.

Figure 5:
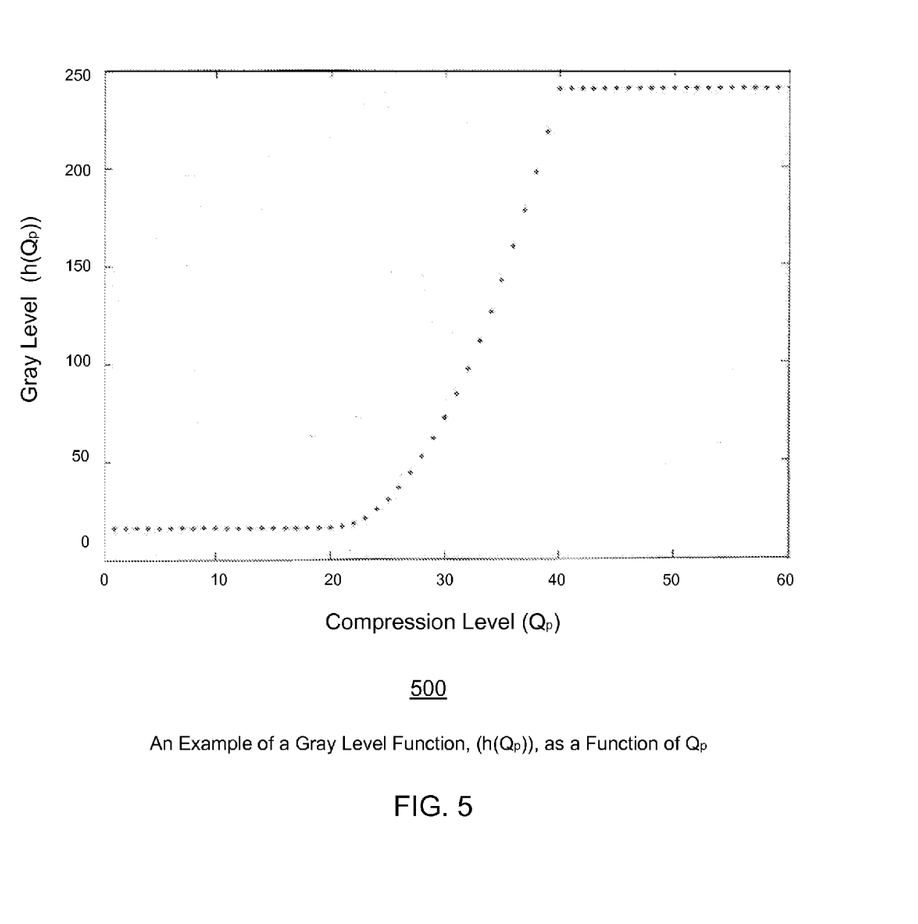
FIG. 5 shows an example of a gray level function, $h(Q_p)$, as a function of $Q_p$, in accordance with an embodiment of the invention.

FIG. 5 shows a graphical example (500) of a gray level function, h($Q_p$), as a function of $Q_p$, in accordance with an embodiment of the invention. In this particular example, the gray level function (h($Q_p$)) is generally low until the compression level ($Q_p$) approaches low 20's. Once the compression level ($Q_p$) exceeds low 20's, the gray level function (h($Q_p$)) correspondingly rises and tops at approximately high 240's, when the compression level ($Q_p$) is greater than low 40's, as shown in the graphical example (500). This example is a representative of typical gray level function characteristics for many video compression standards. As the compression level ($Q_p$) exceeds a "noticeable quality degradation" starting point (e.g. the compression level ($Q_p$) exceeding low 20's), the gray level function rapidly rises in relation to the increasing magnitude of the compression level ($Q_p$). Then, as a quality degradation saturation point approaches (e.g. the compression level ($Q_p$) exceeding low 40's), the gray level function (h($Q_p$)) also tops out at high 240's. Understanding this gray level function (h($Q_p$)) characteristics are particularly useful for intelligent and selective reduction or removal of blocking and banding artifacts for a luminance channel filtering in various embodiments of the invention, as previously illustrated and explained by FIGS. 1~3 and their related descriptions.

FIG. 6 shows a graphical example (600) of a threshold level function g(Bitrate), as a function of bitrate, in accordance with an embodiment of the invention. In this particular example, the threshold level function (g(Bitrate)) for filtering strength is at maximum (e.g. the threshold level of 5) when the bitrate of a video and/or image signal is very low (e.g. under 0.3 Mb/s). As shown in the graphical example (600), the very low bitrate under 0.3 Mb/s corresponds to a compression level ($Q_p$) of 43 or higher. The next range of low bitrate, which is approximately between 0.3 Mb/s and 0.5 Mb/s, corresponds to the compression level ($Q_p$) of 39~42. The next range of bitrate approximately between 0.5 Mb/s and 0.8 Mb/s corresponds to the compression level ($Q_p$) of 36~38. Likewise, as shown in the graphical example (600), the next range of bitrate approximately between 0.8 Mb/s and 1.2 Mb/s corresponds to the compression level ($Q_p$) of 33~35. Then, the next range of bitrate approximately between 1.2 Mb/s and 2.2 Mb/s corresponds to the compression level ($Q_p$) of 27~32, as also shown in the graphical example (600) in FIG. 6. Finally, the last range of bitrate equal to or greater than approximately 2.2. Mb/s corresponds to the compression level ($Q_p$) of 0~26.

As shown by the graphical example (600) in FIG. 6, an approximate range of the compression level ($Q_p$) for a video and/or image signal can be extrapolated from a known bitrate of the video and/or image signal. The function "g(Bitrate)," which represents a threshold output level (g(x)) as a function of bitrate, may be particularly useful when a de-blocking and de-banding unit is utilized in a compression decoder as a post-processing filter, because a specific compression level ($Q_p$) for the video and/or image signal may not be readily available in the compression decoder.

FIG. 7 shows a graphical example (700) of a gray level function h(Bitrate), as a function of bitrate, in accordance with an embodiment of the invention. In this particular example, the gray level function (h(Bitrate)) is approximated and/or extrapolated as a function of a current bitrate of a video and/or image signal. As shown by the graphical example (700), the gray level function (h(Bitrate)) is near 240 when the bitrate is under 0.5 Mb/s. Then, as the bitrate increases, the gray level function (h(Bitrate)) falls off as an inverse curve, and flattens to less than 16, when the bitrate is greater than 5.0 Mb/s.

As shown by the graphical example (700) in FIG. 7, an approximate range of the gray level function for a video and/or image signal can be extrapolated from a known bitrate of the video and/or image signal. The function "h(Bitrate)," which represents a gray level function (h(x)) as a function of bitrate, may be particularly useful when a de-blocking and de-banding unit is utilized in a compression decoder as a post-processing filter for a luminance channel, because a specific compression level ($Q_p$) for the video and/or image signal may not be readily available in the compression decoder.

Figure 8:
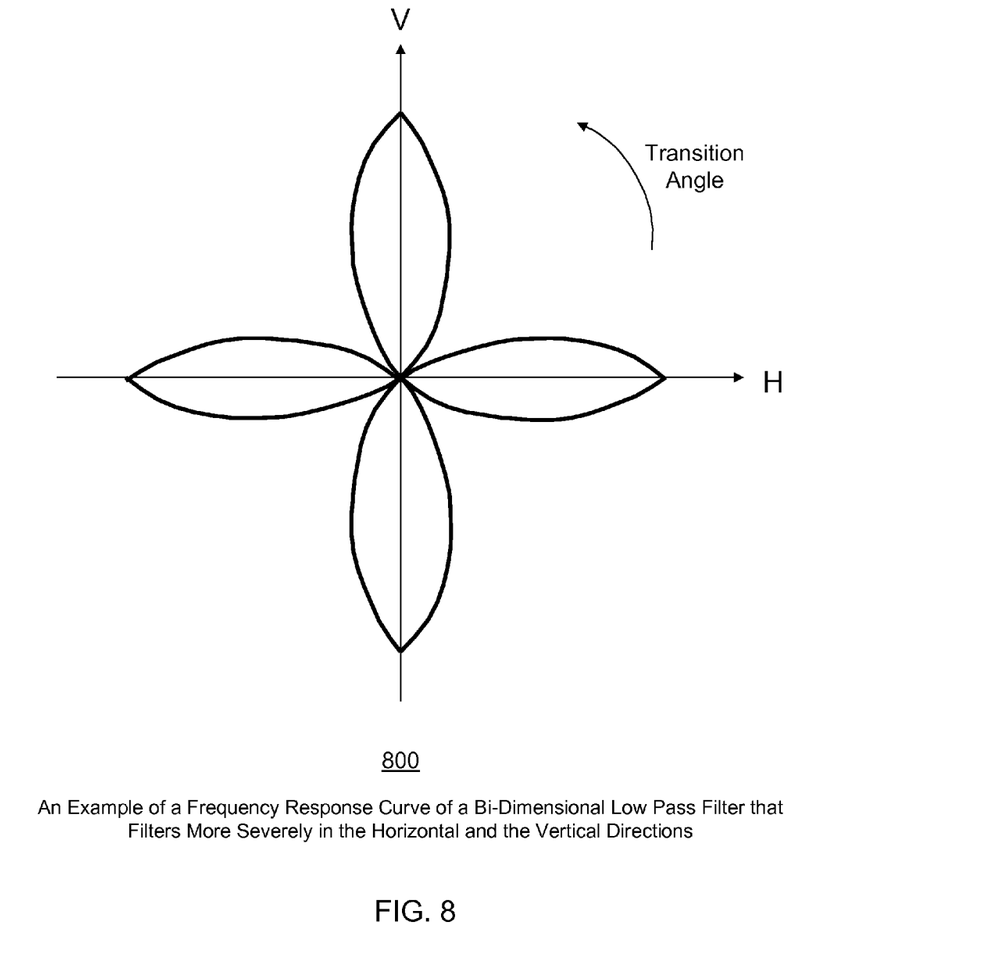
FIG. 8 shows an example of a frequency response curve of a bi-dimensional low pass filter that filters more severely in the horizontal and the vertical directions.

FIG. 8 shows an example (800) of a frequency response curve of a bi-dimensional low pass filter that filters more severely in the horizontal and the vertical directions. In a preferred embodiment of the invention, a low pass filter is incorporated into a de-blocking and de-banding unit, and is bi-dimensional, horizontal only, or vertical only. Furthermore, the low pass filter has an adjustable filter strength, and may be recursive. The adjustable filter strength may be obtained by recursion or another method of providing a variable filter strength. It may be desirable to utilize a bi-dimensional low pass filter that favors horizontal and vertical directions in various embodiments of the invention, because block borders are only horizontal and vertical, thus making non-horizontal or non-vertical transition filtering unnecessary or even harmful for retaining image resolution.

Various embodiments of the invention of have been described above and also illustrated in part by FIGS. 1-8. The present invention provides several advantages over conventional blocking artifact reduction filters and related methods of conventional filtering in image and video data. For example, one advantage is that the novel de-blocking and de-banding filter in accordance with an embodiment of the invention can dynamically adjust its filter strength based on compression levels and particular characteristics of video data that are most relevant to human visual perception, such as gray levels in a processing area.

Another advantage of an embodiment of the present invention is that the novel de-blocking and de-banding filter can largely maintain desirable detail resolution information in a video and/or image signal, while selectively and intelligently reducing and/or removing undesirable blocking and/or banding effects in the video and/or image signal.

Furthermore, another advantage of an embodiment of the present invention is that the novel de-blocking and de-banding filter can reduce or eliminate blocking and banding artifacts in a luminance channel as well as a chrominance channel for video signal processing.

In addition, another advantage of an embodiment of the present invention is that the novel de-blocking and de-banding filter can be utilized by a compression encoder unit as a loop filter, or by a decoder unit as a post-processing filter.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A de-blocking and de-banding filter system for a video signal processing, the de-blocking and de-banding filter system comprising:
    a smart filter strength control unit coupled to a de-blocking and de-banding unit, wherein the smart filter strength control unit comprises a mean calculation unit that generates a mean gray level value and is coupled to a signal subtractor unit, a gray level function (h(x)) generation unit coupled to the signal subtractor unit, a threshold level function (g(x)) generation unit, a binary output switch coupled to the signal subtractor unit, and a signal multiplier unit coupled to the threshold level function (g(x)) generation unit and the binary output switch, and wherein the smart filter strength control unit receives a current gray level (Y) and at least one of a compression level (Qp) and a bitrate of a video signal to generate an adjustable filter strength level (T), wherein the adjustable filter strength level (T) increases when the current gray level (Y) also increases;
    the binary output switch in the smart filter strength control unit that generates zero as an output value when the mean gray level value subtracted by a gray level function value of the gray level function (h(x)) generation unit is greater than zero, or generates one as the output value when the mean gray level value subtracted by the gray level function value of the gray level function (h(x)) generation unit is equal to or less than zero;
    the de-blocking and de-banding unit containing a signal filter, wherein the de-blocking and de-banding unit receives the adjustable filter strength level (T) from the smart filter strength control unit, and wherein the de-blocking and de-banding unit is configured to reduce or remove a blocking artifact or a banding artifact with the signal filter at a variable filter strength controlled by the adjustable filter strength level (T); and
    a CPU and a memory unit configured to execute and operate the smart filter strength control unit and the de-blocking and de-banding unit.

2. The de-blocking and de-banding filter system of claim 1, wherein the adjustable filter strength level (T) is set to zero, thus signifying disablement of the signal filter by the smart filter strength control unit.

3. The de-blocking and de-banding filter system of claim 1, wherein the adjustable filter strength level (T) is set to a threshold level output value of the threshold level function (g(x)) generation unit, because the output value of one from the binary output switch enables a pass-through of the threshold level output value through the signal multiplier unit.

4. The de-blocking and de-banding filter system of claim 1, wherein the signal filter is a low pass filter, which is recursive, bi-dimensional, and favors horizontal and vertical directions for filtering.

5. The de-blocking and de-banding filter system of claim 1, wherein the smart filter strength control unit and the de-blocking and de-banding unit form a loop filter in a video compression encoder.

6. The de-blocking and de-banding filter system of claim 1, wherein the smart filter strength control unit and the de-blocking and de-banding unit are connected to a video decoder as a post-processing filter.

7. The de-blocking and de-banding filter system of claim 1, wherein the variable filter strength of the signal filter depends on both the compression level (Qp) and the current gray level (Y) of the video signal for filtering a luminance channel.

8. The de-blocking and de-banding filter system of claim 1, wherein the variable filter strength of the signal filter depends on both the bitrate corresponding to the compression level (Qp) and the current gray level (Y) of the video signal for filtering a luminance channel.

9. The de-blocking and de-banding filter system of claim 1, wherein the variable filter strength of the signal filter depends only on the compression level (Qp) or the bitrate corresponding to the compression level (Qp) of the video signal for filtering a chrominance channel.

10. The de-blocking and de-banding filter system of claim 1, wherein the smart filter strength control unit also calculates a maximum value, a minimum value, and a filtered value for a processing area in the video signal.

11. The de-blocking and de-banding filter system of claim 1, wherein the bitrate of the video signal sufficiently correlates to the compression level (Qp) for a reliable extrapolation of a gray level function value and a threshold level output value as a function of the bitrate, even without a direct knowledge of the compression level (Qp) by the de-blocking and de-banding filter system.

12. A method of reducing or removing blocking and banding artifacts in a video signal with a de-blocking and de-banding filter system for a luminance channel, the method comprising the steps of:
    receiving a current gray level (Y) and at least one of a compression level (Qp) and a bitrate of the video signal in a smart filter strength control unit;
    calculating a mean gray level value from a mean calculation unit in the smart filter strength control unit;
    generating a gray level function value from a gray level function (h(x)) generation unit in the smart filter strength control unit, wherein the gray level function value is a function of the compression level (Qp) or the bitrate of the video signal;
    subtracting the gray level function value from the mean gray level value in a signal subtractor unit;
    if the signal subtractor unit generates a positive value, then assigning zero to an adjustable filter strength level (T);
    else if the signal subtractor unit generates zero or a negative value, then assigning a threshold level output value from a threshold level function (g(x)) generation unit to the adjustable filter strength level (T), wherein the threshold level output value depends on the compression level (Qp) or the bitrate of the video signal; and transmitting the adjustable filter strength level (T) to a signal filter in the de-blocking and de-banding filter system for the luminance channel, wherein the signal filter selectively reduces or removes a blocking artifact or a banding artifact at a variable filter strength controlled by the adjustable filter strength level (T).

\* \* \* \* \*